United States Patent

[11] 3,585,440

[72] Inventors Francis Fan Lee
Lexington;
Stephen Kent Burns, Cambridge, both of, Mass.

[21] Appl. No. 790,216
[22] Filed Jan. 10, 1969
[45] Patented June 15, 1971
[73] Assignees Francis Fan Lee;
Stephen Kent Burns; Robert H. Rines, part interest to each

[54] MONITOR METHOD AND APPARATUS FOR PHYSIOLOGICAL SIGNALS AND THE LIKE
17 Claims, 6 Drawing Figs.

[52] U.S. Cl. .......... 315/19, 178/6.8, 315/18
[51] Int. Cl. .......... H01j 29/70
[50] Field of Search .......... 315/19, 18; 178/6.8

[56] References Cited

UNITED STATES PATENTS

| | | | |
|---|---|---|---|
| 3,439,218 | 4/1969 | Savinese | 315/18 |
| 3,299,205 | 1/1967 | Stavis | 178/6.8 |
| 3,153,699 | 10/1964 | Plass | 178/6.8 |
| 3,082,294 | 3/1963 | Dean | 178/6.8 |

*Primary Examiner*—Rodney D. Bennett, Jr.
*Assistant Examiner*—Joseph G. Baxter
*Attorney*—Rines and Rines

ABSTRACT: This disclosure deals with a monitor providing an oscilloscope like display, preferably of television raster type, for presenting signal traces in a steady manner resembling a televised image of a strip-chart recorder or the like.

PATENTED JUN 15 1971

3,585,440

Francis Fan Lee
Stephen Kent Burns
Inventors
By Richey and Rines
ATTORNEYS

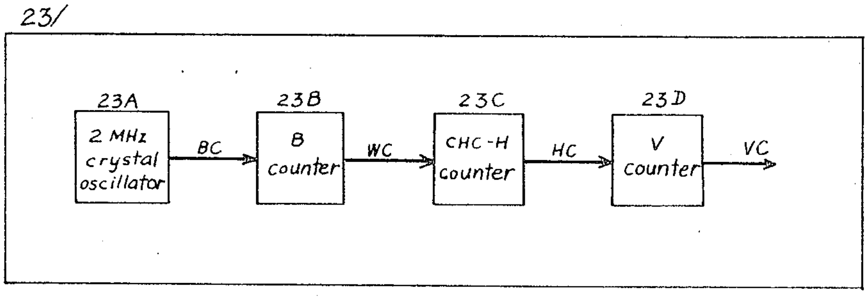
Counter chain in master control circuit 23
Figure 2
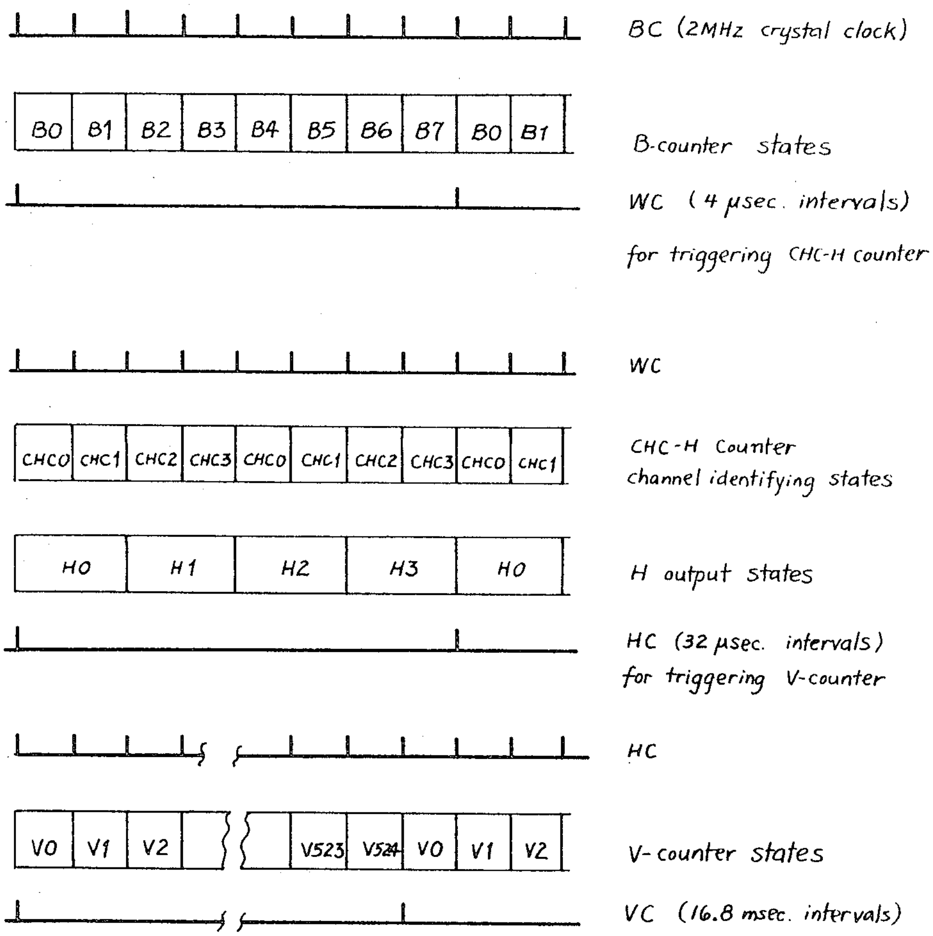
Figure 3-1
Figure 3-2
Figure 3-3
Figure 3
Francis Fan Lee
Stephen Kent Burns
Inventors
By [signature]
ATTORNEYS Position number and sample number relationship for one complete frame of display Illustration of apparent motion Francis Fan Lee
Stephen Kent Burns
Inventors
By [signature]
ATTORNEYS Illustration for "Freeze" control Francis Fan Lee
Stephen Kent Burns
Inventors
By [signature]
ATTORNEYS

MONITOR METHOD AND APPARATUS FOR PHYSIOLOGICAL SIGNALS AND THE LIKE

The present invention relates to monitoring methods and particularly, though not exclusively, adapted for the presentation of physiological signals, including electrocardiographic and other measurements, though it is of important utility for monitoring other types of signals, as well.

Considering, first, such applications as electrocardiographs or other relatively low frequency physiological or similar signals, these are customarily monitored and displayed upon strip-chart recorders or the like, which, however, are subject to mechanical limitations and, of course, require the use of rolls of recording charts. Alternatively, such signals may be displayed upon oscillographic displays in which the signal moves across the screen from one edge to the other and then repeats. The oscillographic displays are disadvantageous, however, because the necessity to use sweep retraces causes continuous time signals to be interrupted, such that adjacent data points are not always presented in contiguous order. It is, accordingly, to the provision of a monitor that can present a steady display corresponding to what looks like a televised image of a strip-chart recorder on a television screen, without such limitations and disadvantages (and without the necessity for a television camera for monitoring a strip-chart recorder, which, of course, is still subject to such limitations and disadvantages), that the present invention is in part directed. In accordance with the invention, in summary, a plurality of signals may be so displayed, and any signal continually maintained or "frozen" upon the display, at will, or recalled and recaptured after display for other utilization, such as a permanent record or storage in a computer or the like.

An object of the invention, accordingly, is to provide a new and improved signal monitor and display method and apparatus that shall not be subject to the above-described limitations and disadvantages.

As will later be more evident, furthermore, the invention is by no means limited to relatively low frequency signals, but is also of important utility with high frequency periodic data in the manner of a sampling oscilloscope.

In accordance with the invention, data that, if displayed directly on a cathode-ray tube oscilloscope or other oscillographic display, would move and be subject to decay of the cathode-ray tube phosphor glow, is displayed at a different time rate to appear continually present, giving a complete picture. Whereas low frequency or slow-speed data conventionally oscilloscopically displayed would be subject to such phosphor glow decay, or fast data would require sampling for such display, the invention enables the before-described televisionlike continual display by virtue of its operation effectively as what may be termed a display-rate converter.

A further object is thus to provide such a novel monitor display-rate converter.

From another point of view, the apparatus of the invention, as applied to such problems as physiological or similar signal monitoring, provides data in speedup form for sequential analysis in a time substantially equal to or less than that needed to accumulate the data. In spectral analysis applications taking a predetermined time T to accumulate data, as another example, the invention enables a speedup factor F that permits F analyses in the time T, enabling the approaching of real-time analysis.

Other and further objects will be explained hereinafter and are more particularly pointed out in connection with the appended claims.

The invention will now be described with reference to the accompanying drawings, FIG. 1 of which is a block schematic diagram illustrating a preferred embodiment;

FIG. 2 is a similar diagram of a portion of the master control circuit of FIG. 1;

FIG. 3–1 through 3–3 are timing and waveform diagrams illustrating the performance of the circuits of FIG. 1;

Figure 1:
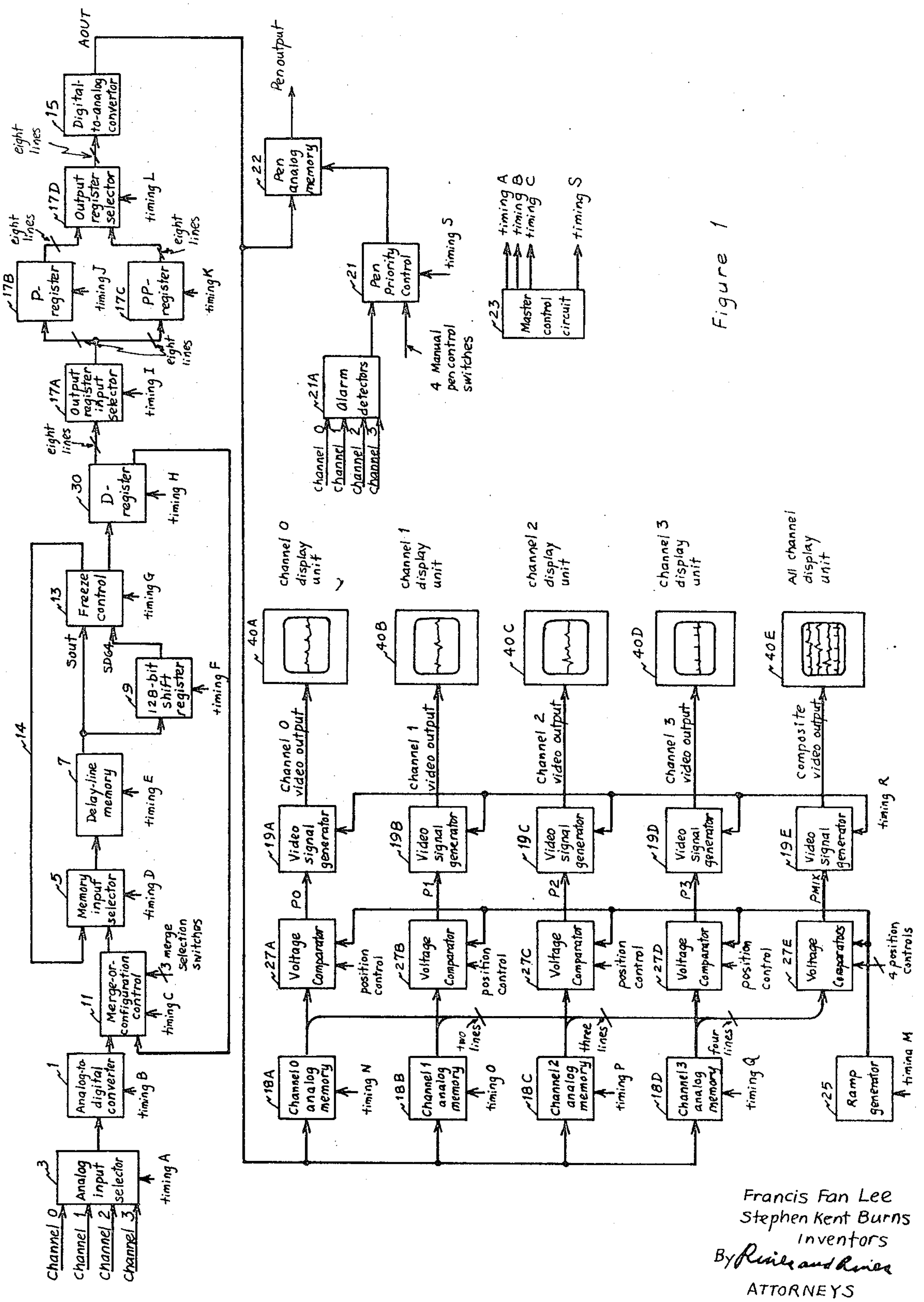

Referring to FIG. 1, the major elements of the apparatus are shown comprising an analog-to-digital converter 1 to which signals (channels 0 through 3 in the illustrated example) are fed from an analog input selector 3; a memory system comprising an input selector 5 connected with a delay-line device 7, and a 128-bit shift register memory 9; an 8-bit serial shift serial-and-parallel output D-register 30; a merge or configuration control 11 for joining channel outputs, as desired, to cause successively converted displays thereof; a freeze display control 13; an output register input selector 17A; a digital-to-analog converter 15 connected with an output register selector 17D which selects one of the two 8-bit output registers P (17B) and PP (17C); a plurality of video signal generators 19A through 19D, receiving converted signals representing channels 0 through 3, respectively, through respective channel analog memory or holding circuits 18A through 18D (and a composite channel video signal generator 19E) and voltage comparators 27A through 27E; an output recapture or reconverter circuit, such as a pen priority control 21 operating to record at the output labeled "pen-output" a special signal stored in a pen analog memory circuit 22 in response to an alarm or similar signal from an alarm detector 21A, such as a signal indicative of a detected abnormality in a channel signal; television-type displays 40A through E, such as television monitors connectable to display the appropriate video output signals from the respective video signal generators 19A through 19E; and a master timing generator circuit 23 that supplies timing inputs to the various devices above described, illustrated as inputs "timing A" through "timing S," providing all timing and control signals for the input data conversion, storage and retrieval of digitized data, and its reconversion into suitable form needed for display and signal processing.

Referring first to the display, in conventional cathode-ray tube displays of time signals, the sweep provides the time-base in the horizontal direction. The signal itself is used to deflect the spot on the screen in the vertical direction. The sweep is either allowed to free run or is triggered by the signal itself or by some other signal. During the retrace of the sweep, which takes a finite amount of time, observation of the signal is not, however, possible. The display technique used in the present invention allows one to observe the most recent period of time of the displayed signals (say, for example, the past 4.3 seconds, as an illustration) on a cathode-ray tube screen at all times, just as if observing the plotted output of a strip-chart recorder with a finite size viewing window. New signals appear at the right edge of the "window," and each signal trace moves at a constant speed to the left disappearing into the left edge. Each signal data point, after appearing on the screen, is retained in the memory for the interval or duration of the display (4.3 seconds in the above illustration), and it may be recovered at the end of such interval. The recovered signal may be recorded on a paper chart recorded ("pen-output"). This may be effected upon the detection of an abnormal event, thus allowing the examination of the signal conditions, say 4.3 seconds, before the event happened, as well as the current signal conditions.

This electronic strip chartlike display is accomplished through the use of a principle that we have termed controlled precession. The basic principle can be illustrated with a simplified example. A memory device containing 1,000 words of storage, with addresses 0, 1, 2, ... 999, and word time of 10 microseconds, is addressed cyclically; i.e. 0, 1, 2, ..., 998, 999, 0, 1, 2, .... At time $t$=0, address 0 is accessed and a signal sample is inserted in it. At $t$=10,010 microseconds, the second signal sample is inserted in address 1. At successive intervals, 10,010 microseconds apart, new signal samples are inserted into the next address, in the cyclic order. After 1,000 such intervals, the memory becomes fully loaded, and each new signal sample overlays the oldest signal sample in the memory. Considering the 1,000 addresses, 0 through 999, as disposed along a circle, the address pointer is advanced one position each 10 microseconds in, say, the clockwise direction. Each revolution plus one 10-microsecond interval (i.e. 10,010 microseconds), a new signal sample is deposited into the addressed location in the memory. Since between sample insertions all memory addresses are traversed, it is possible to readout the recent 1,000 (or less) signal samples as each new signal sample is inserted. As an example, after the 1,000th signal sample has been inserted into the memory, the display sweep is started, and at 10-microsecond intervals for the next 10 milliseconds, the entire signal history is displayed as each consecutive sample is read from the memory. After the 1,000th sample has been readout and displayed, the cycling of the memory address calls for the insertion of the 1,000st signal sample into location 1. After the 1,001st signal sample has been inserted, a new display sweep is started, with the 2nd through the 1,001st sample displayed over the same screen area where the first through the 1,000th signal sample had occupied during the immediately preceding sweep. Each sweep thus advances the display by one sample, giving an appearance of motion across the screen to the entire signal history. The rate at which new signal samples are inserted into the memory differs slightly from the rate at which the memory addresses are cycled, this difference permitting the displayed pattern to precess across the screen. If display of the 500 most recent signal samples is desired, it is only necessary to skip 500 addresses after a new signal sample has been inserted and then start the sweep.

The monitor of the invention thus receives input signals from various measuring instruments and presents what looks like a televised image of a strip-chart recorder on a television display screen. All signal traces move across the screen in a steady, controlled manner instead of the before-described conventional oscilloscope display. By virtue of the monitor memory, moreover, the signal precession can be stopped and the image of the signal "frozen" on the screen, as later explained. As before stated, optionally, the displayed signal and a portion of its past may be recaptured and recorded on a paper strip-chart recorder or stored in a computer as a permanent record, or otherwise used subsequent to the display thereof.

DATA INPUT

The analog input selector 3 of FIG. 1 receives a plurality of separate analog input signals, channels 0 through 3, and sequentially connects in the order 0, 1, 2, and 3, individual signals to the analog-to-digital converter 1, which samples and converts the same into serial digital data. Each sample of each channel input is converted into an 8-bit digital representation. This representation is normally steered through the merge and configuration control 11 and the memory input selector 5, at the appropriate time, for insertion into the delay-line memory 7. When new input data is not being inserted into the delay-line memory 7, the memory input selector 5 recirculates the output signal SOUT of the delay-line memory 7, which output signal would normally pass through the freeze control 13. The output signal SOUT enters the 128-bit shift register 9, the output of which is signal SD64. When a particular channel signal is to be frozen on the display, the freeze control 13, at the appropriate time, recirculates the signal SD64 via path 14, instead of the normal signal SOUT. The total storage capacity of the delay-line memory 7 is 523 words, each word containing 32 bits formed by the four 8-bit samples associated with the four analog input channels 0 through 3. Signal SOUT normally passes through the freeze control 13 and is shifted into the D-register 30 which provides an 8-bit parallel output for the output circuits. Serial output of the D-register is utilized by merge-and-configuration control 11 so that channel 0 data, when it is to be displaced by new data from the analog-to-digital converter 1, may instead be saved and introduced into channel 1 as if it were new data for that channel 1. Thus, channel 1 appears to be an extension for channel 0. Similarly, channels 1 and 2, or 2 and 3 may be so connected. The merge-and-configuration control switches allow manual selection of such channel connections.

DATA OUTPUT

The D-register 30 provides an 8-bit parallel output which is gated into the P-register 17B or PP-register 17C under the master timing control circuit 23, details of which are illustrated in FIG. 2. The P- and PP-registers provide the steady parallel signals which are selected by the digital-to-analog input selector 17D for input to the digital-to-analog converter 15. The output signal AOUT of the digital-to-analog converter 15 is a time-multiplexed reconverted analog voltage representing the various stored samples of the channels 0 through 3.

The time-multiplexed analog voltage AOUT is demultiplexed, and the respective channel analog voltages are held in analog memories 18A through 18D.

Because of the use of a television raster presentation, pulses are required whose position, with respect to the sweep is linearly related to the analog signals. At the beginning of each video line, therefore, a linear voltage ramp is initiated in a ramp generator 25, FIG. 1. This ramp voltage is compared with the analog memory voltage of the individual channels by means of the voltage comparators 27A through 27D. When the ramp voltage becomes equal to an analog memory voltage, a pulse is generated (PO for channel 0, P1 for channel 1, etc.). Since the ramp is a linearly changing voltage, the time of occurrence of this pulse, measured from the beginning of the video line, is a linear function of the analog memory voltage. The pulses PO through P3 for the channels 0 through 3, are used by video signal generators 19A through 19D to generate the respective channel video outputs for respective displays at 40A through 40D. A four-channel voltage comparator 27E takes all four analog memory voltages and generates PMIX which, when used by video signal generator 19E, provides a four-trace display at 40E of all channels suitable for composite or supervisory monitoring purpose.

The before-mentioned pen control consists of the pen demand priority control 21 and a single analog memory circuit 22. A demand on the pen to produce a paper record of data stored in a given channel, whether due to automatic alarm detection at 21A or manual selection (at "switches"), is stored in one of four pen demand flip-flops in the circuit 21 corresponding to the demand requested. If the pen recorder is not busy and no higher priority pen demands exists for any given priority sequence, the pen is immediately assigned to the demanding channel. If, however, either the pen is busy or a higher priority pen demand exists, the lower priority demand flip-flop remains set until the pen is freed.

MASTER TIMING

The master timing control circuit 23 may comprise, for example, a 2-MHz. crystal oscillator 23A, FIG. 2, and a group of counters 23B through D and appropriate gates to derive all the control timing signals "timing A" through "timing S."

In particular, the 2-MHz. crystal oscillator 23A provides a clock pulse train BC, FIG. 3–1, at 0.5-microsecond intervals. The pulses BC trigger B-counter 23B, FIG. 2, which is a divide-by-8 counter having eight states B0, B1, ..., B7 which are used for control purposes. Pulses BC and state B7 generate a second pulse train WC which occurs at 4-microsecond intervals, as illustrated in FIG. 3–1. Pulse train WC is used to trigger a second divide-by-8 counter, CHC-H counter 23C, FIG. 2, the decoded states CHC0, CHC1, CHC2 and CHC3 and H0, H1, H2, H3 of which are shown in FIG. 3–2. The consecutive 32 bits entering the delay-line memory 7, FIG. 1, during each cycle of CHC0, CHC1, CHC2 and CHC3 constitute one word; with the first eight bits at CHC0 time being associated with channel 0, the second eight bits at CHC1 time being associated with channel 1, and so on, with each such 8-bit groups corresponding to one sample of an input channel. Each cycle of H0, H1, H2 and H3 occurs in a 32-microsecond interval. Pulse train WC, FIG. 2, and state H3, FIG. 3–2, are used to produce a third pulse train HC, FIG. 3–3, at 32-microsecond intervals. The pulse train HC, moreover, triggers a divide-by-525 counter, V-counter 23D, FIG. 2. Time for one line of video sweep on the display screen is 64 microseconds or two counts of pulse train HC. One field contains 262.5 lines of video, or 525 counts of pulse train HC. If the field retrace is allowed to occur every cycle of the V-counter 23D, then the video lines will be fully interlaced. If the 525 states of the V-counter 23D are labeled V0, V1, ..., V524, FIG. 3–3, the odd field may be defined to begin with V0 and H0, ending with V524 and H1; and the even field may be defined to begin with V0 and H2, ending with V524 and H3. The complete video synchronizing signal including field retrace blanking is generated with the decoded outputs from the aforementioned counters. Pulse train HC and state V524 generate a fourth pulse train VC which occurs once per field time, as illustrated in FIG. 3–3.

MEMORY INTERLACE

The memory system 7 previously described contains 523 word positions, numbered 0 through 522. If the output SOUT is directly returned to the input, by way of before-described path 14, the positions are recirculated once every 523×32 ×0.5 microsecond or 8.368 milliseconds. If sample set 0 is placed into position 0 at time 0, and new samples are introduced at 524 word time (8.384 millisecond) intervals, then when sample 1 is presented to the memory 7, it will enter into position 2; when sample 3 is presented to the memory, it will enter into position 4; and so on, until sample 261 enters into position 522. At such time, sample 262 enters into position 1, sample 263 enters into position 3, and so on, until sample 522, which occupies the last available position 521. All positions have now been filled. The next sample, 523, is placed over sample 0, and the process of the newest sample overlaying the oldest sample continues. With the exception of the newest and the oldest samples, all consecutive numbered samples are circulated in the memory 7 at two-word-time intervals; and all consecutive even (or odd) numbered samples are circulated at four-word time or 64-microsecond intervals. Since 64 microseconds is the video line time, information emerging from the delay-line 7 is timed correctly for fully interlace television presentation.

Figure 4:
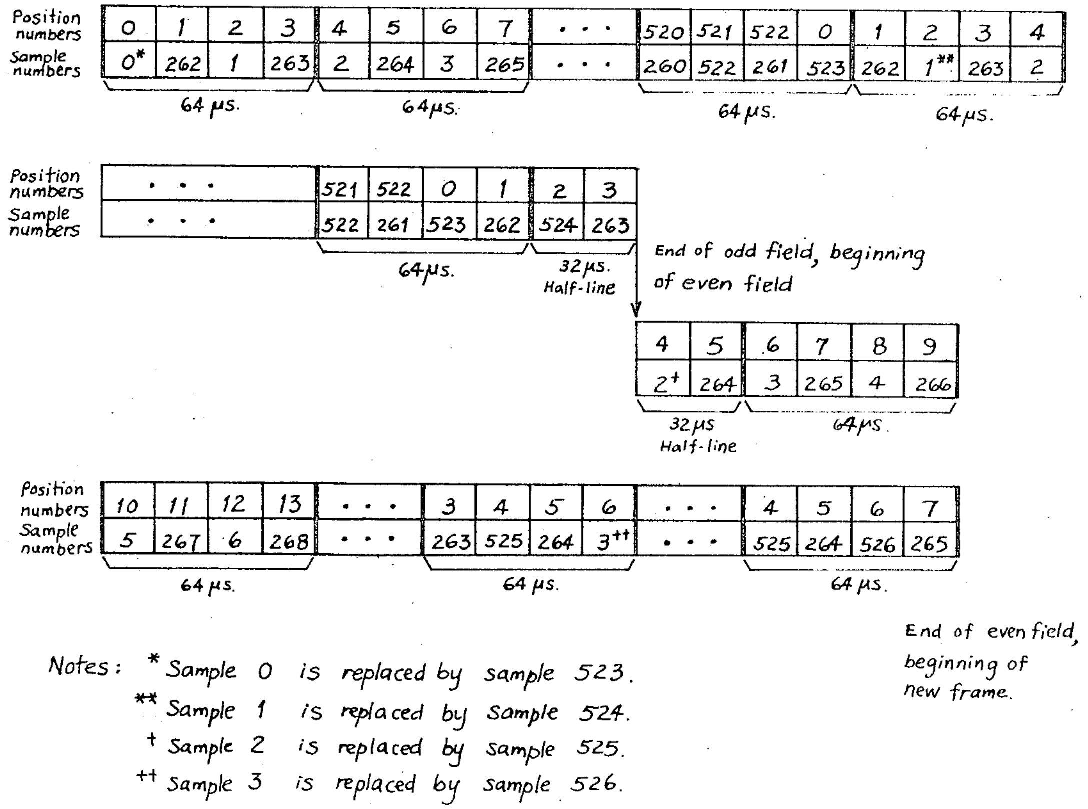
FIG. 4 is a position and sample number chart for a frame of the display of the system of FIG. 1.

The chart, FIG. 4, represents data stored in the delay-line 7, in bracketed sets of four-word positions at 64 microsecond intervals. Except when a new sample is inserted, the emerging data is reinserted into the delay-line. The chart demonstrates that if data is examined at 64-microsecond intervals beginning with sample 0, then the sample number sequence will be 0, 2, 4, 6, ..., 522, 524, followed by sample number sequence 3, 5, 7, 9, ..., 523, 525, followed by 4, 6, 8, ..., 526, 528, etc.

All even-numbered samples are displayed during the odd field time and all odd-numbered samples are displayed during the even field time.

Figure 5:
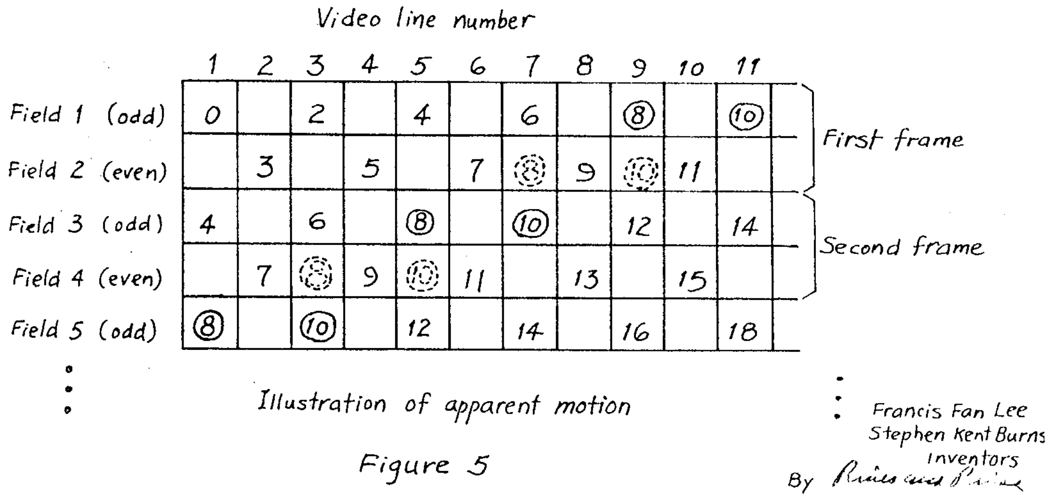
FIG. 5 is a chart of apparent motion of the display.

With each new frame of an odd and an even field, the four oldest samples are displaced from the storage, the remaining samples are advanced in time with respect to the beginning of each field, and four new samples are placed at the end. The data as presented in video form on the video lines appears to show new elements drifting into view and old element disappearing from view, thus giving an appearance of continuous motion across the viewing screen; i.e. the before-mentioned controlled precession. One end of the display sweep or trace corresponds to present time, and the other to an earlier time interval during which updated sets of digital data were stored, in turn corresponding to the channel signals occurring over such time interval. Referring, for example, to FIG. 5, it is shown that sample 0 is displayed on line 1, sample 2 is displayed on line 3, sample 4 is displayed on line 5, etc. during the odd field of the first frame. During the even field of the first frame, sample 3 is displayed on line 2, and sample 5 is displayed on line 4, etc. on all the interlaced lines. Concentrating on samples 8 and 10, they first appear in FIG. 5 on lines 9 and 11. The reappearance of samples 8 and 10 each successive frame places them four line positions ahead; thus they occur at line 5 and line 7 during the second frame. If samples 8 and 10 were displayed during the even field of the first frame, it might be expected that they be located at line positions 7 and 9 in order to give a constant rate of apparent motion. But the interlace requires that only odd-line positions be displayed during the even field. Sample 9 must, therefore, be displayed between where samples 8 and 10 would have occurred. This accounts for the displaying of sample 3 at line position 2 during the even field of the first frame; sample 5 at position 4, etc.

FREEZE CONTROL

The freeze control 13 permits the data associated with any channel, and its extension as determined by merge-and-configuration control 11, to be continuously displayed without apparent motion. The display of such channel is held for an indefinite period of time; hence the use of the word "freeze." The normal channel display may be resumed at any time. More than one channel may be frozen at one time without affecting the operation of the other channels.

The algorithm employed to freeze any channel *n*, involves recirculating the delayed output of the shift register 9 (SD64) during the odd field, and directly recirculating the output SOUT of the delay-line 7 during the even field while the data corresponding to channel *n* is being processed.

Figure 6:
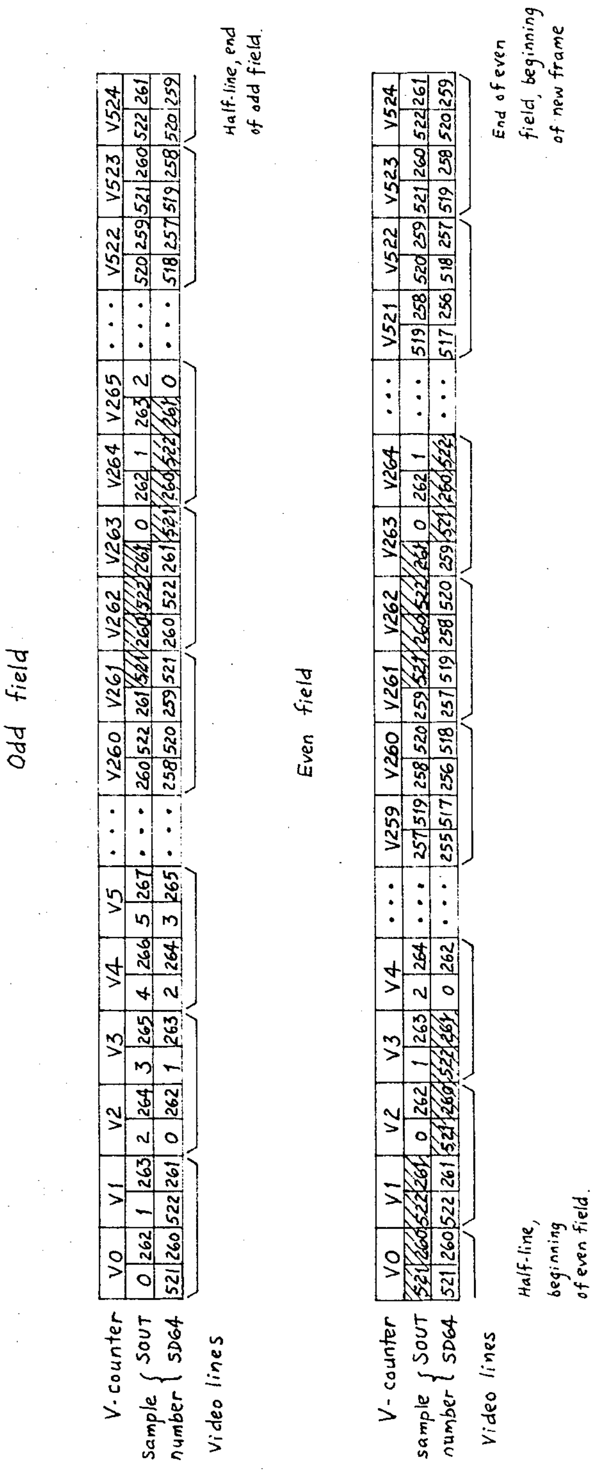
FIG. 6 is a chart illustrating the freezing of a particular display.

This operation is schematically illustrated in the chart of FIG. 6. The sample number output of SD64 always agrees with the sample number of output SOUT for the immediately preceding video line; i.e. represents a delayed output. Since recirculation is taken from SD64 during the odd field, the set of samples 521, 260, 522, and 261 are inserted into the delay-line 7 twice, via path 14. The recurrance of sample 0 (the new replacement sample is inhibited from entering delay-line memory 7 when the channel is to be frozen) is delayed by 64 microseconds and is preceded by the extra set of samples 521, 260, 522 and 261. These sample numbers are shown shaded in the chart of FIG. 6. At the end of the odd field, the 128-bit shift register 9 contains the set of samples numbered 521, 260, 522 and 261, and data existing in the delay-line 7 contains no duplicate samples. The samples 521, 260, 522 and 261 which exist in the delay line 7 at the end of the odd field, are those which were recirculated; but the original set of samples 521, 260, 522 and 261 are now in the 128-bit shift register 9. These duplicated samples will now be discarded since, during even fields, the recirculation originates from the delay line output SOUT. At the end of the even field, the sample numbers in the line and their position numbers are exactly the same as just before the previous odd field. Thus for the channel under freeze consideration, the sample numbers and the position numbers repeat exactly for every frame of an odd and an even field. The precession of sample numbers, moreover, with respect to position numbers, has stopped.

As for the display part of the algorithm the first sample number of each video line interval is used. At the beginning of the odd field, the output SD64 of the shift register 9 is used, producing the sample number sequence:

521, 0, 2, 4, ..., 258, 260.

After sample 260 has been used, the output is switched to be taken directly from the delay line 7 at SOUT. Thus the displayed sample sequence during the odd field is that underscored as follows:

SD64 521, 0, 2, 4, ..., 254, 256, 258, 260, switch output 260, ..., 518, 520

SOUT 0, 2, 4, 6, ..., 256, 258, 260, 260, 262, ..., 520, 522

During the even field, the samples are taken from SOUT to give the sequence:

522, 1, 3, 5, ..., 519, 521.

Since field retrace is initiated at the beginning of a field, sample 521 (occurring at the beginning of the odd field) and sample 522 (appearing at the beginning of the even field) will not be seen because of retrace blanking. All visible samples are displayed in their proper places.

DIGITAL-TO-ANALOG CONVERTER

SOUT, representing samples emerging from the delay-line memory 7, and SD64, representing this same data delayed by 64 microseconds, are selected by the freeze control 13 to give SDIN which is shifted into the D register 30. At the beginning of each video line time, when a sample completely fills the D register 30, the output register input selector 17A transfers the contents of the D register 30 in parallel into the P register 17B. The four channels are transferred in succession at the end of each channel selection time. During the time the D register 30 is preparing for the next transfer, the P register 17B is connected through the output register selector 17D to the digital-to-analog converter 15, and its output AOUT is sampled with the value held in the analog memories 18A through 18D associated with respective channels.

The PP-Register 17C is used to hold the parallel digital output for use by the pen recorder. The pen priority control 21 provides the proper timing signal so that at the selected channel time, signal AOUT is gated into the pen analog memory 22 for operating the recording pen.

In a successfully operated prototype, one one-hundred-twentieth second magnetostrictive delay line was used at the memory 7. The memory contained 523 words of 32 bits each with each word divided into four 8-bit samples. Refinements were incorporated to permit display using the vertical sweep of a television receiver as the time-base, and with each signal sample displayed in terms of position of an intensified pulse along the horizontal line. The display was oriented 90° to permit viewing of the display precession from right to left. The prototype employed 525-line and 2:1 interlace at a frame rate of approximately 30 per second and an input signal sampling frequency of 120 times per second.

While the various components of the apparatus may assume a variety of well-known forms and configurations, the following are illustrative of suitable elements for the purposes of the invention: analog-to-digital converter 1 (Type A 801 of Digital Equipment Corporation, Maynard, Mass., or as described at pages 235—8 and 425—8 of "Digital Logic Handbook," 1968, published by said corporation; or Model ADC-8U of Pastoriza Electronics, Inc., of Newton, Mass.; analog input selector 3 (Type A 121 multiplex control described at pages 220—1 and 425—8 of said Handbook, or Model MOSES-4 of said Pastoriza Electronics, Inc.); delay-line system 7 (Digital Devices, Inc. type line with input and output transducers); shift register 9 (National Semiconductor, Inc., Type MM502 or Type M208 described at pages 61—3 of said Handbook); merge control 11 and freeze control 13 (NAND or NOR gates such as described at pages 150—1 of said Handbook); channel analog memory or holding circuits 18A—18D (Type A-400 described on pages 224—5 of said Handbook or Pastoriza Electronics, Inc., Type SHA-1); pen analog memory circuit 22 (Type A400 described on pages 224—5 of said Handbook or Pastoriza Electronics, Inc. Type SHA-1); and digital-to-analog converter 15 (Type A608 described at pages 230—1 of said Handbook or Pastoriza Electronics, Inc. Type DIC2954—8).

Further modifications will occur to those skilled in the art and all such are considered to fall within the spirit and scope of the invention as defined in the appended claims.

What we claim is:

1. A method of continual display of time-sequential signals, that comprises, continually storing, in time sequence required for display, sets of digital data corresponding to signals occuring over a fixed time interval, repetitively updating said storing by replacing the oldest stored data with new data corresponding to present time, repetitively producing a display trace sweep the duration of which is short compared to said fixed time interval, and applying the stored data to said sweep to display said signals thereon in analog form with one end of the sweep always corresponding to present time and the other end to time the said fixed interval earlier, such that the display appears continually to precess without retrace.

2. A method as claimed in claim 1 and in which the further step is performed of temporarily suspending the updating of said storing to freeze the display.

3. A method of continual display of time-sequential signals, that comprises, storing, in time sequence required for display, successive samples of digital data corresponding to signals occurring over a time interval, repetitively producing a display sweep the duration of which is short compared to said interval, applying the stored data to said sweep to display said signals thereon in analog form as a fixed display, and repetitively updating said storing to end with the most recent said sample to change the display.

4. Monitor apparatus for producing a televisionlike display of time-sequentially occurring signals having, in combination, means for receiving said signals, means for converting the signals into digital representations thereof, means connected with said converting means for storing said digital representations in predetermined positional sequence, means connected with the storing means for reconverting the stored digital representations into corresponding analog signals, memory circuit means provided with an input and an output with the input connected to said reconverting means for storing the said analog signals, televisionlike display means, and means for connecting said memory circuit means output to said display means.

5. Monitor apparatus as claimed in claim 4 and in which there is interposed between said memory circuit means and said display means voltage comparator and video signal generator means.

6. Monitor apparatus as claimed in claim 4, and in which the receiving means comprises means for applying a plurality of separate signals along a plurality of channels, and said converting means comprises means for selecting signals from the plurality of channels in sequential order.

7. Monitor apparatus as claimed in claim 6, and in which said memory circuit means comprises a plurality of holding circuits, one corresponding to each of the signals to be displayed, and provided with means for enabling the successive holding circuits to store only the reconverted analog signals of the corresponding channel.

8. Monitor apparatus as claimed in claim 4, and in which the said storing means continually stores sets of said digital representations corresponding to signals occurring over a time interval in an updated fashion always ending with present time, and in which means is provided for controlling the said display means to display the reconverted analog signals on a sweep of duration short compared to the said time interval.

9. Monitor apparatus as claimed in claim 8, and in which said storing means comprises a memory input selector connected to delay-line means.

10. Monitor apparatus as claimed in claim 9, and in which merge control means is connected between the converting means and said memory input selector, and shift register and freeze control means are connected between said delay-line means and said reconverting means, with a feedback path connected between said freeze control means and said memory input selector to recirculate delayed stored digital representations to the selector.

11. Monitor apparatus as claimed in claim 10 and in which said reconverting means comprises a digital-to-analog converter and in which there is provided between said freeze control means and said reconverting means a D-register connected with an output register input selector and a pair of paths respectively containing a P-register and a PP-register feeding an output register selector.

12. Monitor apparatus as claimed in claim 8, and in which one of the memory circuit means is connected to one of the display means to display the reconverted analog signals of a plurality of channels.

13. Monitor apparatus as claimed in claim 4 and in which there is interposed between said memory circuit means and said display means voltage comparator means operated with ramp generator means, and video signal generator means.

14. Monitor apparatus as claimed in claim 8, and in which means is provided, operable following display of a signal upon the display means, for extracting said signal in one of digital and analog forms.

15. Monitor apparatus as claimed in claim 14 and in which there is provided means comprising pen control and memory means for recording a selected displayed signal.

16. Monitor apparatus as claimed in claim 14 and in which said last-named means is actuated by alarm means.

17. Monitor apparatus as claimed in claim 8, and in which means is provided, operable upon display of a signal, for freezing said signal upon the display means.